(12) United States Patent
Brack et al.

(10) Patent No.: US 6,590,068 B2
(45) Date of Patent: Jul. 8, 2003

(54) REDUCTION OF REACTION BY-PRODUCTS IN POLYCARBONATE RESINS

(75) Inventors: Hans Peter Brack, Etten-Leur (NL); James Anthony Cella, Clifton Park, NY (US); Dennis Karlik, Bergen op Zoom (NL); Lina Prada, Murcia (ES)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 09/683,064

(22) Filed: Nov. 14, 2001

(65) Prior Publication Data

US 2003/0100704 A1 May 29, 2003

(51) Int. Cl.[7] ................................. C08F 6/00
(52) U.S. Cl. ..................................... 528/480
(58) Field of Search ......................... 528/480

(56) References Cited

U.S. PATENT DOCUMENTS

| | | |
|---|---|---|
| 4,323,668 A | 4/1982 | Brunelle |
| 5,468,836 A | 11/1995 | Okano et al. |
| 5,852,156 A | 12/1998 | Hachiya et al. |

FOREIGN PATENT DOCUMENTS

| | | |
|---|---|---|
| EP | 0 709 421 | 5/1996 |
| EP | 0 980 861 | 2/2000 |
| EP | 0 982 340 | 3/2000 |
| EP | 0 985 696 | 3/2000 |
| JP | 5-17565 | 1/1993 |
| WO | WO 02/060977 | 8/2002 |

*Primary Examiner*—Terressa M. Boykin
(74) *Attorney, Agent, or Firm*—Oppedahl & Larson LLP

(57) ABSTRACT

Polycarbonate resin containing reduced levels of reaction by-products can be prepared by adding to the polycarbonate a scavenging agent having the formula:

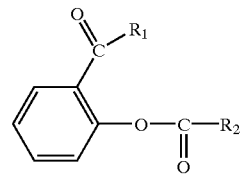

wherein $R_1$ is alkoxy, phenoxy, benzyloxy or phenyl, and $R_2$ is a substituted or unsubstituted $C_1$–$C_{30}$ alkyl group, $C_6$–$C_{30}$ aryl group, $C_7$–$C_{30}$ aralkyl group or $C_6$–$C_{30}$ aryloxy group and processing the resulting mixture at an elevated temperature and for a period of time such that the scavenging agent reacts with linear Fries products to produce capped linear Fries products, and with residual phenols (monohydric or dihydric) to produce capped phenols and ortho-substituted phenols.

20 Claims, 4 Drawing Sheets

BPA Polycarbonate

Linear Fries

Branched Fries

BPA Polycarbonate

Linear Fries

Branched Fries

REDUCTION OF REACTION BY-PRODUCTS IN POLYCARBONATE RESINS

BACKGROUND OF INVENTION

This application relates to a method for reducing the levels of reactive reaction by-products, including in particular linear Fries products and residual monohydric or dihydric phenols, such as bisphenol A (BPA) or phenol in polycarbonate resin compositions.

Polycarbonate resins are commonly formed by a melt transesterification process in which a diaryl carbonate such as diphenyl carbonate is reacted with a dihydric phenol. In the course of this reaction, so-called Fries products may be formed. Fries products may be linear or branched, as shown in FIG. 1, and have been generally recognized as being detrimental to the characteristics of the polycarbonate resin for use in various applications. Thus, for example, Fries products may be associated with reduction in stability, reaction with additives, increased coloration, and loss of transparency, moisture resistance and weather resistance. Further, inclusion of Fries products is associated with a reduction in ductility and impact strength. Branched Fries products can result in polycarbonates which are partially insoluble in conventional solvents such as methylene chloride and lead to an alteration in the melt flow properties. (U.S. Pat. No. 5,468,836)

In addition to Fries products, polycarbonate resins frequently may contain residual dihydric phenol as well as the phenolic reaction product of the transesterification reaction. These phenolic compounds can also detract from the qualities of the polycarbonate resin. For example, polycarbonate compositions with decreased aromatic monohydroxy compounds have been shown to exhibit reduced levels of crazing after exposure to moist heat, less interruption of continuous injection molding processes for cleaning of deposited materials (i.e, less plate-out), and less development of uneven color, for example as a result of deposition of black spots or development of brown streaks. (U.S. Pat. No. 5,852,156). Plate-out has also been associated with high amounts of residual monomers of all types, i.e., phenol, diaryl carbonate and dihydric phenol, in the polycarbonate. (EP 0 709 421)

While reaction by-products such as Fries products and monohydric phenols and residual dihydric phenol have been recognized as undesirable to the quality of the polycarbonate resin, efforts to reduce the amount of such by-products have either been of limited effectiveness or have been cumbersome and expensive. For example, JP 5017565 teaches that levels of impurities like phenol in melt polycarbonate can be reduced by adding the melt polycarbonate to 5 times the weight of dimethylcarbonate, stirring at the boiling point for 5 hours, filtering and then drying the filtered cake for 5 hours at 100 degrees C. EP 0 985 696 discloses a methodology for reduction of linear Fries products to reduce fluorescence. The method makes use of low temperatures, special stirrers and special catalyst to achieve this result. Thus, the reduction in linear Fries products is achieved at the expense of reactor throughput and the molecular weight of the produced resin, but does not address problems associated with residual phenolic monomers. EP 0 709 421 uses acidic components (such as phosphoric acid) to reduce residual monomers, but does not reduce the amount of Fries products.

Thus, there remains a need for a simple and effective method which reduces both the amount of Fries products and the amount of residual monohydric and dihydric phenols in a polycarbonate resin. It is an object of the present invention to provide such a method.

SUMMARY OF INVENTION

In accordance with the present invention polycarbonate resin containing reduced levels of reactive reaction by-products can be prepared by a method comprising the steps of: (a) reacting a diaryl carbonate and a dihydric phenol in a melt transesterification reaction to produce a composition containing polycarbonate polymer, and one or more reaction by-products selected from the group consisting of linear Fries products and monomeric phenols and one or more residual unreacted dihydric phenol; (b) adding to the composition a scavenging agent to form a mixture, said scavenging agent having the formula:

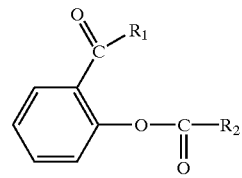

wherein $R_1$ is alkoxy, phenoxy, benzyloxy or phenyl, and $R_2$ is a substituted or unsubstituted $C_1$–$C_{30}$ alkyl group, $C_6$–$C_{30}$ aryl group, $C_7$–$C_{30}$ aralkyl group or $C_6$–$C_{30}$ aryloxy group; (c) processing the mixture at an elevated temperature and for a period of time such that the scavenging agent reacts with linear Fries products to produce capped linear Fries products, and with residual monohydric and dihydric phenols to produce volatile ortho-substituted phenols and capped phenolic species; and (d) separating ortho-substituted phenol, if present, from the processed mixture, thereby producing a polycarbonate resin containing reduced levels of reactive reaction by-products.

Alternatively, the scavenging agent may be added to any polycarbonate resin composition which contains linear Fries products or residual monomeric or dihydric phenols the removal of which would be desirable. Thus, a further aspect of the invention is a method for reducing the amount of such materials in a polycarbonate resin composition comprising the steps of adding to a composition comprising polycarbonate resin and one or more materials selected from the group consisting of linear Fries products and residual monohydric and dihydric phenols a scavenging agent as described above to form a mixture; processing the mixture at an elevated temperature and for a period of time such that the scavenging agent reacts with linear Fries products to produce capped linear Fries products, and with residual phenols to produce volatile ortho-substituted phenols and capped phenolics; and separating the volatile ortho-substituted phenol from the processed mixture.

DETAILED DESCRIPTION

The present invention provides a method for preparation of a polycarbonate resin containing reduced levels of reactive reaction by-products. As used in the specification and claims of this application, the term "reactive reaction by-products" refers to linear Fries products and residual phenols. Residual phenols include residual dihydric phenols and monohydric phenols, for example the phenol produced as the transesterification by-product, when the materials are present.

The invention makes use of a common scavenging agent which is capable of reacting with both linear Fries products and with residual phenols. The scavenging agent has the formula

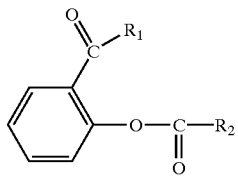

wherein $R_1$ is alkoxy, phenoxy, benzyloxy or phenyl, and $R_2$ is a substituted or unsubstituted $C_1$–$C_{30}$ alkyl group, $C_6$–$C_{30}$ aryl group, $C_7$–$C_{30}$ aralkyl group or $C_6$–$C_{30}$ aryloxy group. Specific examples of preferred $R_1$ groups are methoxy, n-propoxy, phenoxy and benzyloxy. When $R_2$ is substituted, suitable substituents include alkoxycarbonyl groups, phenoxycarbonyl groups, benoxycarbonyl groups, 2-(alkoxycarbonyl)phenyloxycarbonyl groups, 2-(phenoxycarbonyl)phenyloxycarbonyl groups, 2-(benoxycarbonyl)phenyloxy carbonyl groups, 2-(alkoxycarbonyl)phenyloxycarbonyloxy groups, 2-(phenoxycarbonyl)phenyloxycarbonyloxy groups and 2-(benoxycarbonyl) phenyloxy carbonyloxy groups.

Figure 1:
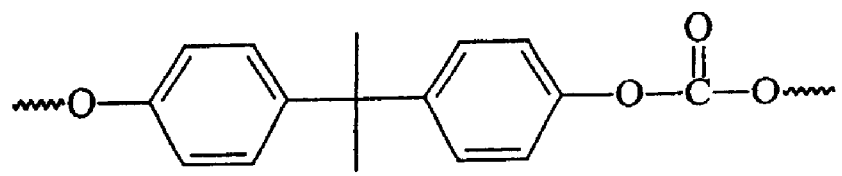
FIG. 1 shows the structure of linear and branched Fries products.
Figure 1:
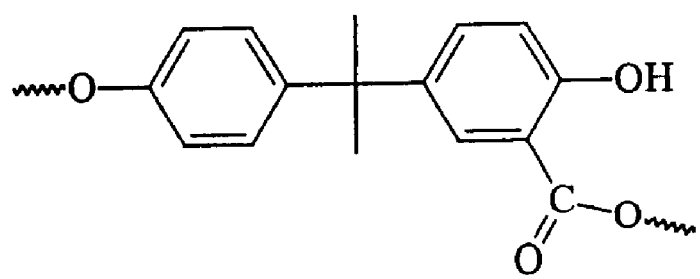
Figure 1:
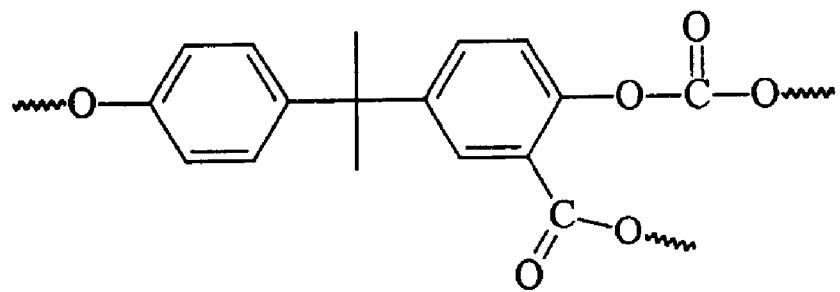
Figure 2:
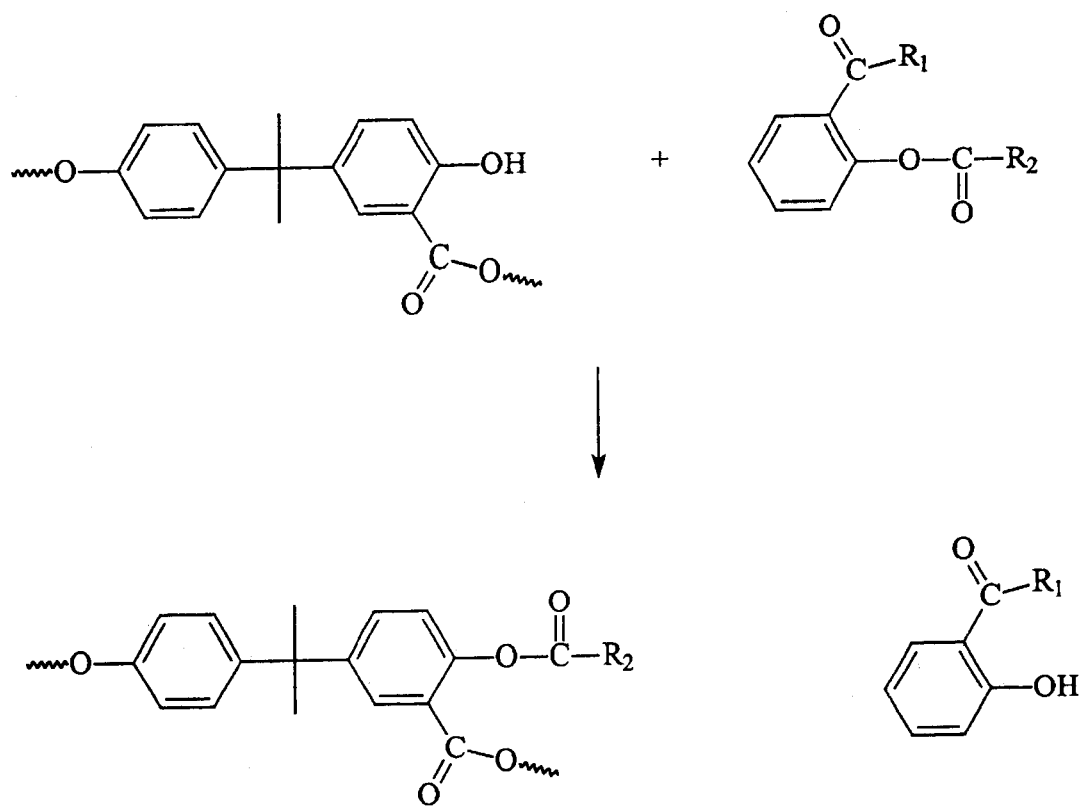
FIG. 2 shows the reaction of the scavenging agent with a linear Fries product.

FIG. 2 shows the reaction of the scavenging agent with a linear Fries product. As shown, the scavenging agent participates in a transesterification reaction, capping the hydroxyl group at the potential branch point in the linear Fries product. This results in the production of a less-reactive capped species having no free OH groups and which is thus less detrimental to the quality of the polycarbonate product. End-capping of linear Fries helps avoid the formation of significant amounts of branched Fries product. In particular, capping with an ester instead of a carbonate (monofunctional versus difunctional) gives a capped species that cannot easily grow further.

Figure 3A:
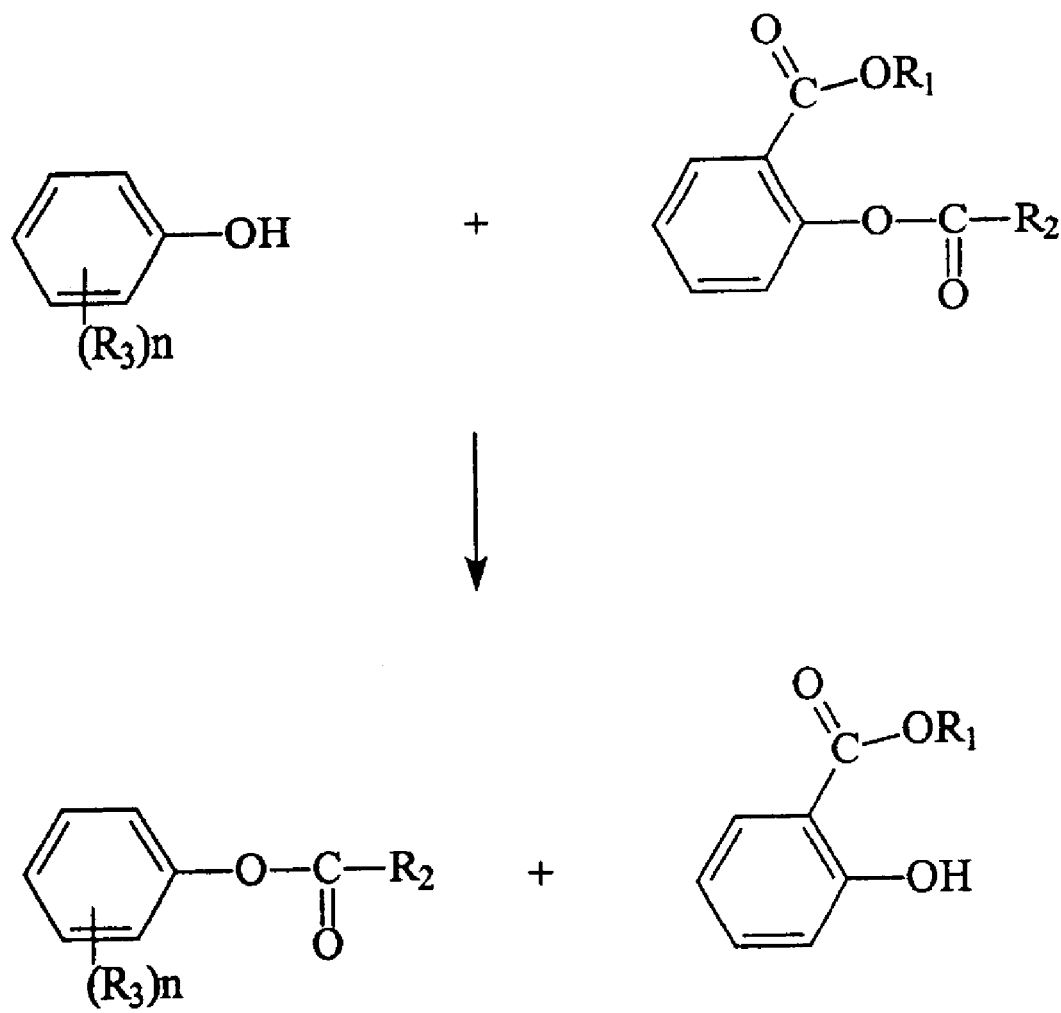
FIGS. 3A and 3B show the reaction of the scavenging agent with residual monohydric and dihydric phenols.
Figure 3B:
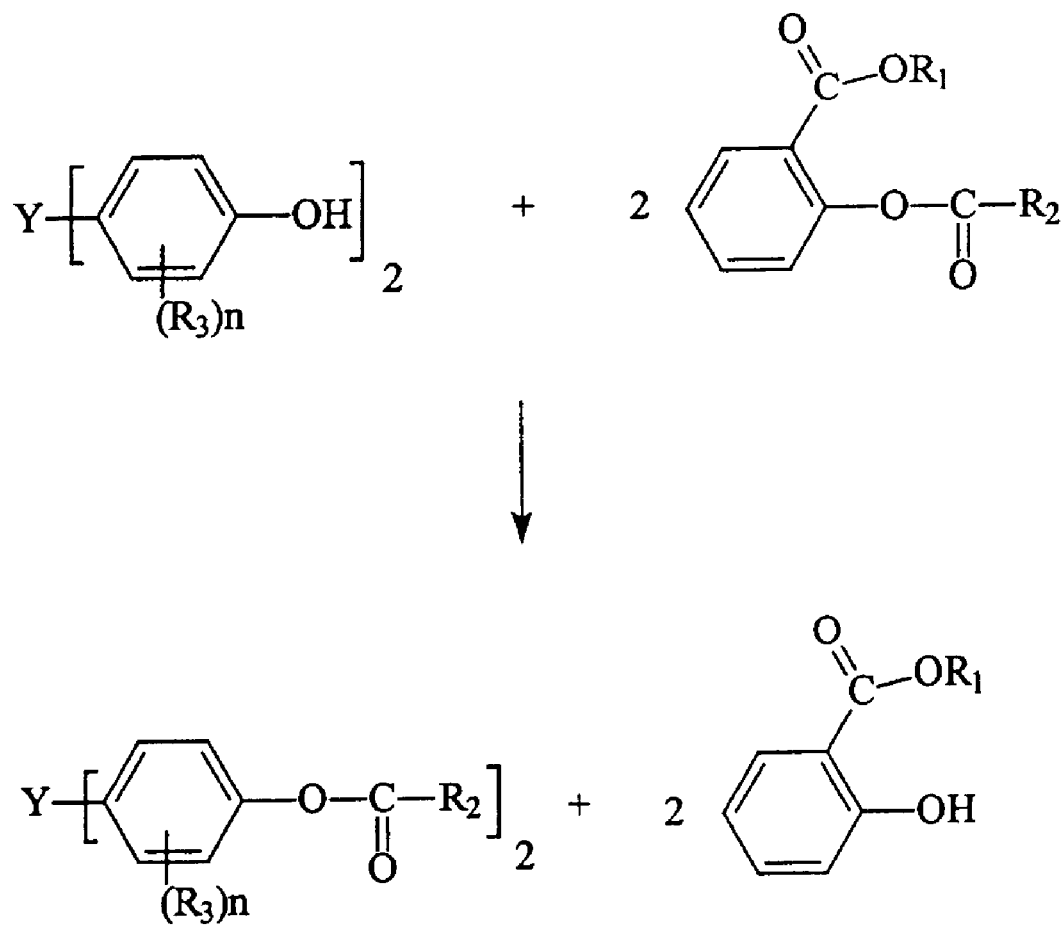

In addition to reaction with linear Fries, the scavenging agent will also react with residual monohydric and dihydric phenols as shown generally in FIGS. 3A and 3B. In FIG. 3A, the reaction of phenol with the scavenging agent is shown. Ester exchange result in an ester and a volatile ortho-substituted phenol. The ortho-substituted phenols are less reactive than phenol in back-biting reactions which lead to molecular weight degradation of polycarbonates, and they are volatile and can thus be readily removed from the melt by distillation prior to further reaction. The ester product is not removed, but the ester product is of higher molecular weight and less reactive (ester versus free OH) with additives and therefore not detrimental for color etc.

FIG. 3B shows the reaction of a dihydric phenol (BPA) with the scavenging agent of the invention.

In accordance with a first embodiment of the invention, polycarbonate is made by reacting a diaryl carbonate and a dihydric phenol in a melt transesterification reaction. The techniques for performing melt transesterification reactions are well known, and are, for example, described in Organic Polymer Chemistry by K. J. Saunders, 1973, Chapman and Hall Ltd., as well as in a number of U.S. patents, including U.S. Pat. Nos. 3,442,854; 5,026,817; 5,097,002; 5,142,018; 5,151,491; and 5,340,905. As is known in the art, there are numerous diaryl carbonates and dihydric phenols which may be employed. The specific diaryl carbonate and the specific dihydric phenol selected will depend on the nature of the desired polycarbonate. Common diary carbonates which may be employed include but are not limited to diphenyl carbonate, ditolyl carbonate, m-cresyl carbonate, and dinaphthyl carbonate. Common dihydric phenols include but are not limited to bis(hydroxyaryl) alkanes such as bis(4-hydroxyphenyl)methane; 1,1-bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl) phenylmethane; 2,2-bis(4-hydroxy-1-methylphenyl) propane; 1,1-bis(4-hydroxy-t-butylphenyl) propane; and 2,2-bis(4-hydroxy-3-bromophenyl)propane; bis (hydroxyaryl)cycloalkanes such as 1,1-(4-hydroxyphenyl) cyclopentane and 1,1-bis(4-hydroxyphenyl)cyclohexane; dihydroxyaryl ethers such as 4,4'-dihydroxydiphenyl ether and 4,4'dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. In one embodiment, the aromatic dihydroxy compound is bisphenol A (BPA).

The transesterification reaction is performed at an elevated temperature under melt conditions. The reaction may be performed in a batch reactor or a static mixer, although more commonly the reaction will be performed in the continuous reaction system including in series a mixing drum, one or more reactors (for example 2), 1 or more polymerizers (for example 2) and an extruder. This results in formation of a composition polycarbonate polymer, and one or more reaction by-products selected from the group consisting of linear Fries products and monohydric and dihydric phenols. The composition may also contain residual diaryl carbonate, i.e., the polymerization need not have reached the final degree of polymerization which is desired.

The transesterification reaction may take place in the presence of any of the commonly known additives which are used to control the characteristics of the product polycarbonate including but not limited to end-capping agents to control the end-cap level of the product polycarbonate.

After at least partial polymerization in the melt transesterification reaction, the scavenging agent is added to the composition. In a continuous reaction system, the scavenging agent may be added to the melt in one of the reactors (generally the last), prior to introduction into a polymerizer (generally the first), or in one of the polymerizers. The scavenging agent is suitably added after the polycarbonate has reached an Mn of 2,000 to 16,000 g/mol, more preferably 5,000 to 15,000 g/mol, and most preferably 7,000 to 14,000 g/mol in amounts sufficient to react with at least some of the reaction by-products, and preferably with substantially all of the reaction by-products present in the composition. The amount of scavenging agent added is conveniently defined as a mole ratio or stoichiometry relative to the total free OH content of the PC product, where the total free OH content is defined as the sum of linear Fries, free OH end groups, and monohydric and dihydric phenols. Suitably, the scavenging agent is added as a mole ratio of from 0.5 to 2 relative to the free OH content, for example at a mole ratio of 0.8 to 1.3.

The resulting mixture of the scavenging agent and the polycarbonate-containing composition is processing at an elevated temperature and for a period of time such that the scavenging agent reacts with linear Fries products to produce capped linear Fries products, and with monohydric and dihydric phenols to produce volatile ortho-substituted phenols and capped phenols. For example, the mixture is suitably processed at a temperature of from 260 to 320 degrees for 1 to 30 minutes. Additional polymerization of polycarbonate may be occurring concurrently.

Ortho-substituted phenol is separated from the processed mixture to produce a polycarbonate resin containing reduced levels of reaction by-products. This can be conveniently achieved via distillation, since the boiling point of the ortho-substituted phenols is substantially lower than the boiling points of other components in the mixture.

The use of a scavenging agent in accordance with the invention may be applied in the context of any polycarbonate resin composition which contains linear Fries products and/or monohydric or dihydric phenols. Thus, a further embodiment of the invention is a method of modifying a polycarbonate composition to contain reduced levels of these materials by addition of the scavenging agent and processing under melt conditions. Capped phenolics are much less detrimental to the polycarbonate resin properties (no free OH and higher MW).

The present invention provides the ability to reduce levels of both linear Fries products and monohydric and dihydric phenolic compounds, and does so with a single additive. Furthermore, the recovered ortho-substituted phenols can be readily converted back to scavenging agent by reaction with an appropriate ester containing the desired $R_2$ group in a transesterification reaction. Thus, the invention provides a simple, low cost approach to reducing levels of reaction by-products and improving the characteristics of polycarbonate resins.

The invention which has been described generally and which is defined by the claims of this application will now be further described with reference to the following, non-limiting examples. In these examples polycarbonate of A, B, C or D grade was used as the starting material. The characteristics of these polycarbonates are summarized in Table 1.

TABLE 1

| Property | Polycarbonate A | Polycarbonate B | Polycarbonate C | Polycarbonate D |
|---|---|---|---|---|
| Molecular Weight Mw/ ×10³ g/mole | 21.7 | 8.76 | 8.11 | 18.3 |
| Molecular Number Mn ×10³ g/mole | 8.67 | 4.71 | 4.05 | 8.34 |
| Free-OH content/ppm | 745 | 5930 | 4050 | 669 |
| Endcap ratio/% | 81 | 55.9 | 52.1 | 83.6 |
| Residual PhOH/ppm | 100 | 1737 | 1893 | 132 |
| Residual BPA/ppm | 30 | 2018 | 823 | 25 |
| Residual DPC/ppm | 450 | 1811 | 2854 | 450 |

The properties of the polycarbonates produced in the working and comparative examples were measured as follow. Mw and Mn were measured by GPC analysis of 1 mg/ml polymer solutions in methylene chloride versus polystyrene standards. Free-OH content was measured by UV-Visible analysis of the complexes formed of the polymer with $TiCl_4$ in methylene chloride solution. Endcap levels were calculated from the free OH content and Mn values. The amount of residual phenol (PhOH), BPA and DPC were measured by HPLC analysis. The total Fries content of the polycarbonate samples were determined by HPLC analysis of the polycarbonates after base hydrolysis in methanol. NMR analysis was used to determine the ratio of linear to total Fries. The amount of linear Fries in the polycarbonate was calculated from the total Fries content and the ratio of linear Fries to total Fries.

EXAMPLE 1

A batch reactor tube was charged with 127.0 g of polycarbonate A and 1.87 g ($6.12 \times 10^{-3}$ moles) of 2-carbomethoxy-phenyl-2-naphthoate (2-CMPN), as the scavenging agent, under nitrogen. The mixture was heated to a temperature of 300° C. and stirred for 30 minutes under nitrogen at atmospheric pressure. The polymer was samples from the reaction tube and analyzed. The results are summarized in Table 2.

EXAMPLE 2

Example 1 was repeated, except that 1.95 g ($6.12 \times 10^{-3}$ moles) of 2-carbomethoxy-phenyl-2-stearate (2-CMPS) was used as the scavenging agent. The polymer was samples from the reaction tube and analyzed. The results are summarized in Table 2.

EXAMPLE 3

Example 1 was repeated, except that 2.35 g ($6.12 \times 10^{-3}$ moles) of 2-carbomethoxy-phenyl-p-cumylphenyl carbonate (2-CMPpCC) was used as the scavenging agent. The polymer was samples from the reaction tube and analyzed. The results are summarized in Table 2.

EXAMPLE 4

A vacuum of 0.5 mbar was applied to the polycarbonate prepared in Example 1 (containing 2-CMPN), and the reaction was continued for another 30 minutes at 300° C. The polymer was samples from the reaction tube and analyzed. The results are summarized in Table 2.

EXAMPLE 5

A vacuum of 0.5 mbar was applied to the polycarbonate prepared in Example 2 (containing 2-CMPS), and the reaction was continued for another 30 minutes at 300° C. The polymer was samples from the reaction tube and analyzed. The results are summarized in Table 2.

EXAMPLE 6

A vacuum of 0.5 mbar was applied to the polycarbonate prepared in Example 3 (containing 2-CMPpCC), and the reaction was continued for another 30 minutes at 300° C. The polymer was samples from the reaction tube and analyzed. The results are summarized in Table 2.

EXAMPLE 7

Polycarbonate was prepared in a continuous reaction system consisting of pre-polymerization tanks and a horizontally-agitated polymerization tank. Bisphenol A and diphenyl carbonate in a molar ratio of 1.08:1 were continuously supplied to a heated agitation tank where a uniform solution was produced. About 250 μeq ($2.5 \times 10^{-4}$ mole/mole BPA) of tetramethylammonium hydroxide and 1 μeq ($1 \times 10^{-6}$ mole/mole BPA) of NaOH were added to the solution as catalysts. The solution was then successively supplied to the pre-polymerization tanks and horizontally-agitated polymerization tanks, arranged in sequence, and the polycondensation reaction was allowed to proceed to produce starting polymer "B" emerging from the outlet stream of the second pre-polymerization tank for Example 7 with a Mw of 8759 g/mol, an Mn of 4710 g/mol, and an endcap level of about 55%. This material had an intrinsic viscosity IV of about 0.218 dl/g. 2-carbomethoxy-phenyl-phenyl carbonate (2-CMPPC) was added as a scavenging agent by means of a heated static mixer to the molten polymer outlet stream of the pre-polymerization tanks (inlet stream of the horizontally-agitated polymerization tank) in an amount of 1.95 mass % relative to the molten polymer stream. The polymer stream containing the 2-CMPPC was processed in the horizontally-agitated polymerization tank until the molecular weight Mw increased to about 17,000 to 20,000 and the number average molecular weight Mn increased to about 7,500 to 9,000. The endcap level in this polymer increased by about 10 to 20%. The resulting polymer was analyzed. The results are summarized in the Table 3.

EXAMPLE 8

The procedure of Example 7 was repeated using 2-carbopropoxy-phenyl-phenyl carbonate (2-CPrPPC) as the scavenger in an amount of about 2.15 mass % relative to the molten polymer stream. The resulting polymer was analyzed. The results are summarized in the Table 3.

EXAMPLE 9

A batch reactor tube was charged with 50 g of polycarbonate C and 0.8390 g ($2.79 \times 10^{-3}$ moles) of -carbopropoxy-phenyl-phenyl carbonate (2-CPrPPC), as the scavenging agent, under nitrogen. The mixture was heated to a temperature of 300° C. and reacted for 20 minutes at pressure of 0.5 mbar. The polymer was sampled from the reaction tube and analyzed. The results are summarized in Table 4.

EXAMPLE 10

A batch reactor tube was charged with 50 g of polycarbonate D and 0.5901 g ($2.17 \times 10^{-3}$ moles) of 2-carbomethoxy-phenyl-phenyl carbonate (2-CMPPC), as the scavenging agent, under nitrogen. The mixture was heated to a temperature of 300° C. and reacted for 20 minutes at pressure of 0.5 mbar. The polymer was sampled from the reaction tube and analyzed. The results are summarized in Table 4.

Comparative Example 1

Example 1 was repeated but instead of the scavenging agent 1.31 g ($6.12 \times 10^{-3}$ mole) of diphenyl carbonate was charged to the reaction tube. The polymer was samples from the reaction tube and analyzed. The results are summarized in Table 2.

Comparative Example 2

A vacuum of 0.5 mbar was applied to the polycarbonate prepared in Comparative Example 1 (containing added DPC), and the reaction was continued for another 30 minutes at 300° C. The polymer was samples from the reaction tube and analyzed. The results are summarized in Table 2.

Comparative Example 3

Example 7 was repeated but instead of the scavenging agent diphenyl carbonate was added. The polymer was sampled from the polymerization tank and analyzed. The results are summarized in Table 3.

Comparative Example 4

Example 7 was repeated, except that no scavenger was added. The polymer was sampled from the polymerization tank and analyzed. The results are summarized in Table 3.

Comparative Example 5

A batch reactor tube was charged with 25 g of polycarbonate C under nitrogen. The mixture was heated to a temperature of 300° C. and reacted for 20 minutes at pressure of 0.5 mbar. The polymer was sampled from the reaction tube and analyzed. The results are summarized in Table 4.

Comparative Example 6

A batch reactor tube was charged with 25 g of polycarbonate D under nitrogen. The mixture was heated to a temperature of 300° C. and reacted for 20 minutes at pressure of 0.5 mbar. The polymer was sampled from the reaction tube and analyzed. The results are summarized in Table 4.

TABLE 2

| Example | Scavenger | PhOH (ppm) | BPA (ppm) | DPC (ppm) |
| --- | --- | --- | --- | --- |
| Starting Material | — | 110 | 30 | 450 |
| 1 | 2-CMPN | 60 | 20 | 190 |
| 2 | 2-CMPS | 110 | 20 | 300 |
| 3 | 2-CMPpCC | 40 | 20 | 220 |
| 4 | 2-CMPN | 60 | 10 | 50 |
| 5 | 2-CMPS | 70 | 10 | 80 |
| 6 | 2-CMPpCC | 20 | 20 | 120 |
| Comp 1 | DPC | 110 | 10 | 9730 |
| Comp 2 | DPC | 80 | 20 | 340 |

TABLE 3

| Example | Scavenger | PhOH (ppm) | BPA (ppm) | Linear fries (ppm) |
| --- | --- | --- | --- | --- |
| 7 | 2-CMPPC | 105.5 | 23.0 | 102 |
| 8 | 2-CPrPPC | 113.5 | 18.1 | 127 |
| Comp 3 | DPC | 130.2 | 125.1 | 259 |
| Comp 4 | — | 122.0 | 30.6 | 168 |

TABLE 4

| Example | Scavenger | PhOH (ppm) | BPA (ppm) | Linear fries (ppm) |
| --- | --- | --- | --- | --- |
| 9 | 2-CPrPPC | 90 | 10 | 160 |
| 10 | 2-CMPPC | 70 | 6 | 263 |
| Comp 5 | — | 118 | 46 | 357 |
| Comp 6 | — | 100 | 17 | 273 |

What is claimed is:
1. A method for preparation of a polycarbonate resin containing reduced levels of reactive reaction by-products comprising the steps of:
   (a) reacting a diaryl carbonate and a dihydric phenol in a melt transesterification reaction to produce a composition containing polycarbonate polymer, and one or more reaction by-products selected from the group consisting of linear Fries products and monohydric and dihydric phenols;

(b) adding to the composition a scavenging agent to form a mixture, said scavenging agent having the formula:

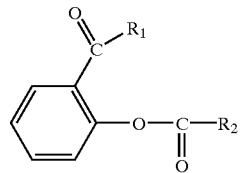

wherein $R_1$ is alkoxy, phenoxy, benzyloxy or phenyl, and $R_2$ is a substituted or unsubstituted $C_1$–$C_{30}$ alkyl group, $C_6$–$C_{30}$ aryl group, $C_7$–$C_{30}$ aralkyl group or $C_6$–$C_{30}$ aryloxy group; (c) processing the mixture at an elevated temperature and for a period of time such that the scavenging agent reacts with linear Fries products to produce end-capped linear Fries products, and with monohydric and dihydric phenols to produce capped monohydric and dihydric phenols and ortho-substituted phenols; and (d) separating the ortho-substituted phenol from the processed mixture, thereby producing a polycarbonate resin containing reduced levels of reactive reaction by-products.

2. The method of claim 1, wherein R1 is selected from the group consisting of methoxy, n-propoxy, phenoxy and benzyloxy.

3. The method of claim 1, wherein R2 is substituted with a substituent selected from among alkoxycarbonyl groups, phenoxycarbonyl groups, benzyloxycarbonyl groups, 2-(alkoxycarbonyl)phenyloxycarbonyl groups, 2-(phenoxycarbonyl)phenyloxycarbonyl groups, 2-(benzyloxycarbonyl)phenyloxy carbonyl groups, 2-(alkoxycarbonyl) phenyloxycarbonyloxy groups, 2-(phenoxycarbonyl)phenyloxycarbonyloxy groups and 2-(benzyloxycarbonyl)phenyloxy carbonyloxy groups.

4. The method of claim 1, wherein the polycarbonate to which the scavenging agent is added has an Mn of 2,000 to 16,000 g/mol.

5. The method of claim 4, wherein the polycarbonate has an Mn of 5,000 to 15,000 g/mol.

6. The method of claim 4, wherein the polycarbonate has an Mn of 7,000 to 14,000 g/mol.

7. The method of claim 1, wherein the scavenging agent is added in an amount such that the mole ratio of scavenging agent to free OH content is in the range from 0.5 to 2.

8. The method of claim 7, wherein the scavenging agent is added in an amount such that the mole ratio of scavenging agent to free OH content is in the range from 0.8 to 1.3.

9. The method of claim 1, wherein the method is performed in a batch reactor.

10. The method of claim 1, wherein the method is performed in a continuous reaction system.

11. A method for modifying a polycarbonate resin composition containing one or more undesirable components selected from the group consisting of linear Fries products and monohydric and dihydric phenols comprising the steps of;

(a) adding to the composition a scavenging agent to form a mixture, said scavenging agent having the formula:

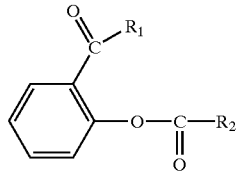

wherein $R_1$ is alkoxy, phenoxy, benzyloxy or phenyl, and $R_2$ is a substituted or unsubstituted $C_1$–$C_{30}$ alkyl group, $C_6$–$C_{30}$ aryl group, $C_7$–$C_{30}$ aralkyl group or $C_6$–$C_{30}$ aryloxy group; (b) processing the mixture at an elevated temperature and for a period of time such that the scavenging agent reacts with linear Fries products to produce end-capped linear Fries products, and with monohydric and dihydric phenols to produce capped monohydric and dihydric phenols and ortho-substituted phenols; and (c) separating any ortho-substituted phenol from the processed mixture, thereby producing a polycarbonate resin containing reduced levels of undesirable components.

12. The method of claim 11, wherein R1 is selected from the group consisting of methoxy, n-propoxy, phenoxy and benzyloxy.

13. The method of claim 11, wherein R2 is substituted with a substituent selected from among alkoxycarbonyl groups, phenoxycarbonyl groups, benoxycarbonyl groups, 2-(alkoxycarbonyl)phenyloxycarbonyl groups, 2-(phenoxycarbonyl) phenyloxycarbonyl groups, 2-(benzyloxycarbonyl)phenyloxy carbonyl groups, 2-(alkoxycarbonyl)phenyloxycarbonyloxy groups, 2-(phenoxycarbonyl) phenyloxycarbonyloxy groups and 2-(benzyloxycarbonyl)phenyloxy carbonyloxy groups.

14. The method of claim 11, wherein the polycarbonate to which the scavenging agent is added has an Mn of 2,000 to 16,000 g/mol.

15. The method of claim 14, wherein the polycarbonate has an Mn of 5,000 to 15,000 g/mol.

16. The method of claim 14, wherein the polycarbonate has an Mn of 7,000 to 14,000 g/mol.

17. The method of claim 11, wherein the scavenging agent is added in an amount such that the mole ratio of scavenging agent to free OH content is in the range from 0.5 to 2.

18. The method of claim 17, wherein the scavenging agent is added in an amount such that the mole ratio of scavenging agent to free OH content is in the range from 0.8 to 1.3.

19. The method of claim 11, wherein the method is performed in a batch reactor.

20. The method of claim 11, wherein the method is performed in a continuous reaction system.

* * * * *